June 2, 1964    H. J. CZAJKOWSKI    3,135,083
COTTON HARVESTER SHIELD WITH LIFTER
Filed April 15, 1963    2 Sheets-Sheet 1

INVENTOR.
HENRY J. CZAJKOWSKI.
BY
ATTORNEY.

INVENTOR.
HENRY J. CZAJKOWSKI.
BY
Willard S. Gwent
ATTORNEY.

United States Patent Office 3,135,083
Patented June 2, 1964

3,135,083
COTTON HARVESTER SHIELD WITH LIFTER
Henry J. Czajkowski, 301 24th Ave., Yuma, Ariz.
Filed Apr. 15, 1963, Ser. No. 272,927
1 Claim. (Cl. 56—28)

This invention pertains to cotton harvester apparatus and is particularly directed to an improved cotton harvester shield with flexible fingered wheels for lifting the plant and dropped cotton from the ground preceding the passage of the picker fingers of the cotton harvester in operative engagement therewith.

One of the objects of this invention is to provide a cotton harvester shield particularly adapted to facilitate the guidance of cotton into the cotton harvester or cotton picking machine.

Another object is to provide a cotton harvester shield which is well adapted to put tall lodged cotton as well as short low branched cotton into position for picking.

A further object is to provide improved cotton harvester shields which are equipped with adjustable clamps which mount lifter wheels capable of raising low branches and low cotton into picking position.

It is also an object to provide special shields for a cotton picking machine front and which have a more inclined angle so as to efficiently guide plants in gently and permit parting tangled rank cotton.

And it is an object to provide a special skirt design for the aforementioned shield arranged to gather low branches and low cotton bolls.

The aforementioned shields are provided with arms to receive special adjustable clamps where the lifting wheels are mounted, which lifting wheels raise low branches and cotton into picking position.

It is also an object to use a rugged simple construction eliminating spring counterbalance and chain stop by skidding the leading ends of the shields on the ground surface, preferably by use of flexible shield tips such as shown in copending patent application Serial Number 226,926, filed September 28, 1962.

Further features and advantages of this invention will appear from a detailed description of the drawings in which.

Figure 1:
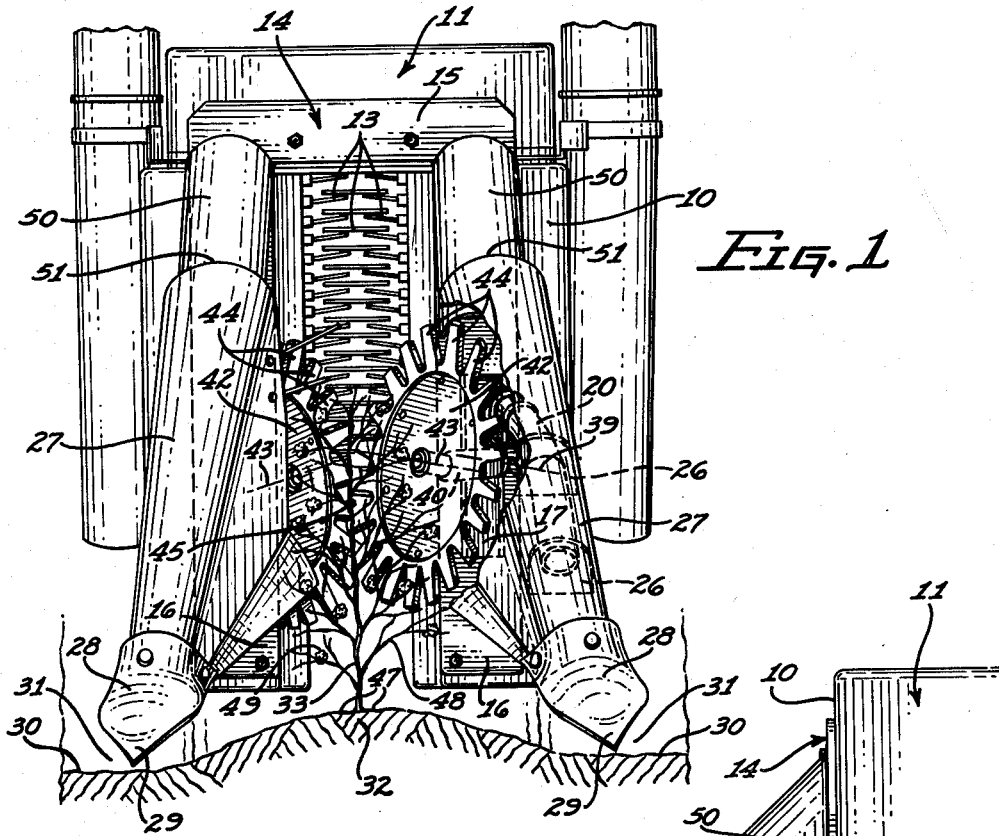
FIG. 1 is a front perspective view of a cotton harvester shield incorporating the features of this invention.
Figure 2:
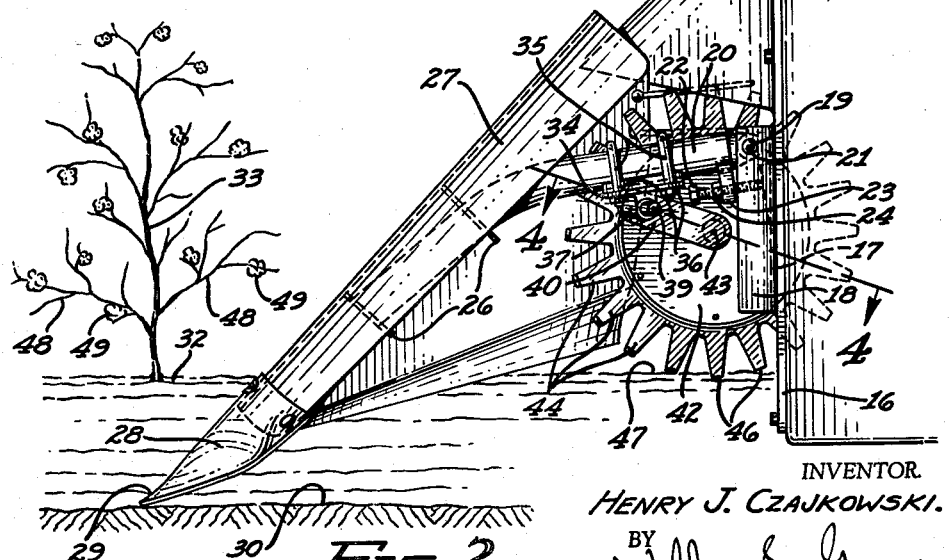
FIG. 2 is a left hand side elevation of the apparatus shown in FIG. 1.
Figure 3:
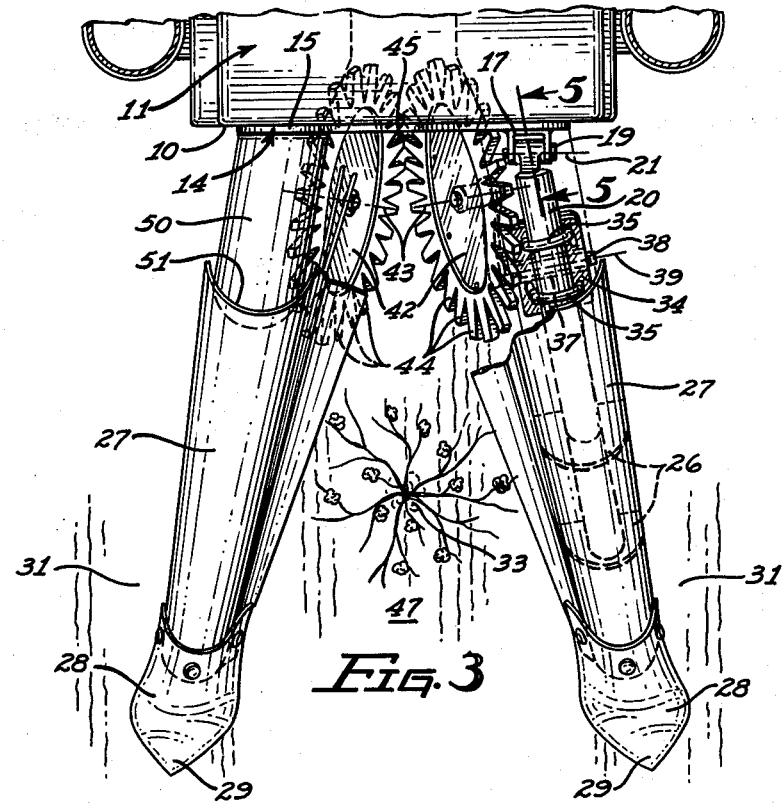
FIG. 3 is a plan view of the apparatus shown in FIG. 1.
Figure 4:
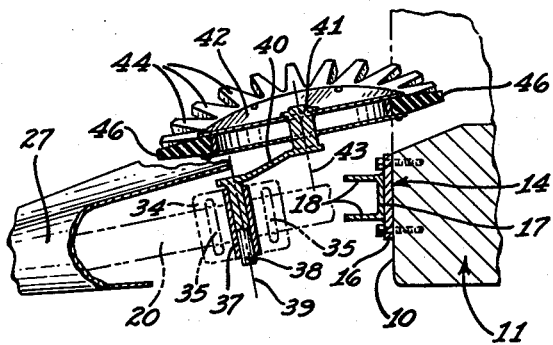
FIG. 4 is a fragmentary sectional view on the line 4—4 of FIG. 2.
Figure 5:
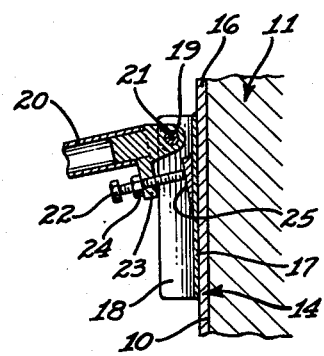
FIG. 5 is a fragmentary sectional view on the line 5—5 of FIG. 3.

As an example of one embodiment of this invention, there is shown a shield apparatus adapted to be applied to the front end surface 10 of a conventional cotton harvester or cotton picking machine having the usual plant entrance slot 12 and picker finger 13 or the like devices 13 therein. The shield apparatus comprises a basic inverted U-shaped or horse collar-like head plate or frame 14 comprising the upper horizontal portion 15 and the integral downwardly extending portions 16 depending from the outer ends of the horizontal portion 15 which is suitably bolted to the outer surface 10 of the harvester 11.

Fixed on each of the portions 16 of the frame 14 are brackets 17 having spaced vertically disposed side plates 18 in which are mounted the horizontally disposed pivot pins 19 to which the rear ends of the mounting arms 20 are pivotally connected so that each arm 20 may swing in a vertical plane about the axis 21 of the pivot pins 19. The downward swinging movement of the arms 20 is limited by stop screws 22 which are threadedly mounted in a boss 23 formed integral with the rear ends of the arms 20 and may be locked in desired adjusted positions in the boss 23 by a suitable jamb nut 24. The inner end of the stop screw 22 is adapted to engage the abutment surface 25 formed on the brackets 17. The front outer ends of the mounting arms 20 are rigidly connected by suitable brackets 26 to the lower shields 27 to the lower outer ends of which are fixed the flexible nose pieces 28 having deflectable tips 29 which are normally positioned at the ground line 30 of the furrow 31 each side of the plant row 32 containing the cotton plants 33 to be operated upon by appropriate adjustment of the stop screws 22. The flexible tips may preferably be of a character to turn under to form a skid surface should an obstruction above the furrow surface be encountered causing the shields 27 and arms 20 to swing upwardly from normal position to clear the obstruction without damage to the shield apparatus in a manner, for example, as set forth in application Serial Number 226,926 mentioned above.

A mounting plate 34 is adapted to be adjustably positioned on the rear portions of each mounting arm by suitable U-bolts 35 and clamp nuts 36. A bearing bushing 37 is rigidly mounted on the underside of mounting plate 34 and pivotally receives the shank 38 for rocking about the axes 39. Fixed to each of the shanks 38 are the shank arms 40 having spindles 41 upon which are journaled the lifter wheels 42 to revolve about axes 43. Flexible rubber lifter fingers 44 are formed about the periphery of the lifter wheels 42. The axes 43 of each pair of wheels 42 slope upwardly and forwardly so that the flexible fingers 44 intermesh in the area 45 in a manner such as set forth in copending application Serial Number 203,312, filed June 18, 1962 so that forward movement of the cotton harvester causes the outer peripheral ends 46 of the flexible fingers 44 to roll on the ground surface 47 of the plant row burm 32, whereby the wheels 42 lift the low lying branches 48 and cotton bolls 49 into an acceptable position to be operated upon by the picker fingers 13. Upper shields 50 are fixed on the frame 14 and extend forwardly and downwardly telescopically into the upper ends 51 of the lower shields 27 so as to adequately protect the mechanism on the rear portions of the mounting arms 20.

While the apparatus herein disclosed and described constitutes a preferred form of the invention, it is also to be understood that the apparatus is capable of mechanical alteration without departing from the spirit of the invention, and that such mechanical arrangement and commercial adaptation as fall within the scope of the appendent claims are intended to be included herein.

Having thus fully set forth and described this invention what is claimed and desired to be obtained by United States Letters Patent is:

A cotton harvester shield comprising in combination:
(a) a frame,
(b) a pair of forwardly and downwardly extending mounting arms pivotally mounted at their rear ends on said frame,
(c) stop means between said frame and said arms to positively limit downward swinging movement of said mounting arms,
(d) lower shields fixed to the outer ends of said mounting arms,
(e) flexible ground contacting nose pieces on the outer ends of said lower shields,
(f) mounting plates,
(g) clamp bolts adapted to adjustably secure said mounting plates to the rearward positions of said mounting arms,
(h) a bearing bushing fixed on each of said mounting plates,
(i) shank arms pivotally mounted in said bearing bushings to swing freely about upwardly and forwardly sloping axes on said mounting arms, (j) lifter wheels journaled on the outer ends of said shank arms on axes substantially parallel to said first mentioned axes, (k) and flexible lifter fingers radially disposed about the periphery of said lifter wheels adapted to intermesh at a point between the lifter wheels located rearwardly and below the axes of rotation of said lifter wheels.

References Cited in the file of this patent

UNITED STATES PATENTS

| | | |
|---|---|---|
| 1,967,924 | Court | July 24, 1934 |
| 2,731,780 | Witt | Jan. 24, 1956 |

FOREIGN PATENTS

| | | |
|---|---|---|
| 129,416 | Russia | June 25, 1960 |